June 22, 1926.

A. L. CARTER

LIQUID GAUGE

Filed July 31, 1922

1,589,510

Inventor
Alick L. Carter
by Geyer & Popp
Attorneys

Patented June 22, 1926.

1,589,510

UNITED STATES PATENT OFFICE.

ALICK L. CARTER, OF KENMORE, NEW YORK, ASSIGNOR, BY MESNE ASSIGNMENTS, TO THE GROLAN MANUFACTURING COMPANY, OF DAYTON, OHIO, A CORPORATION OF DELAWARE.

LIQUID GAUGE.

Application filed July 31, 1922. Serial No. 578,808.

This invention relates to a liquid level gauge for determining the level of the liquid in a receptacle, for instance, the level of the oil in the crank case of an explosion engine or the level of the gasoline in a liquid fuel supply or storage tank.

In devices of this character as heretofore constructed, variations would occur in the reading of the gauge due to increasing and decreasing the volume of air in the conduits connecting the pressure tube in the supply tank and the indicating device during changes in temperature of the atmosphere.

The purpose of this invention is to provide simple, efficient and reliable means which compensate for variations in the temperature and thus ensure correct reading of the liquid gauge.

Figure 1:
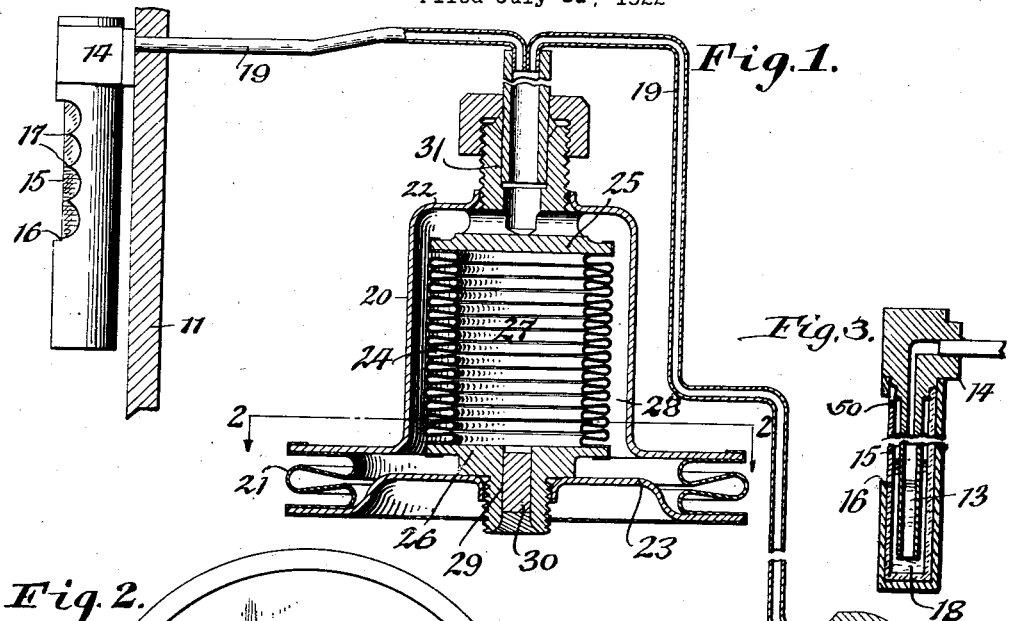
Figure 3:
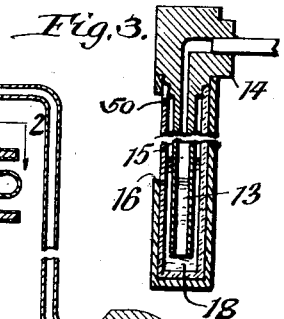
Figure 2:
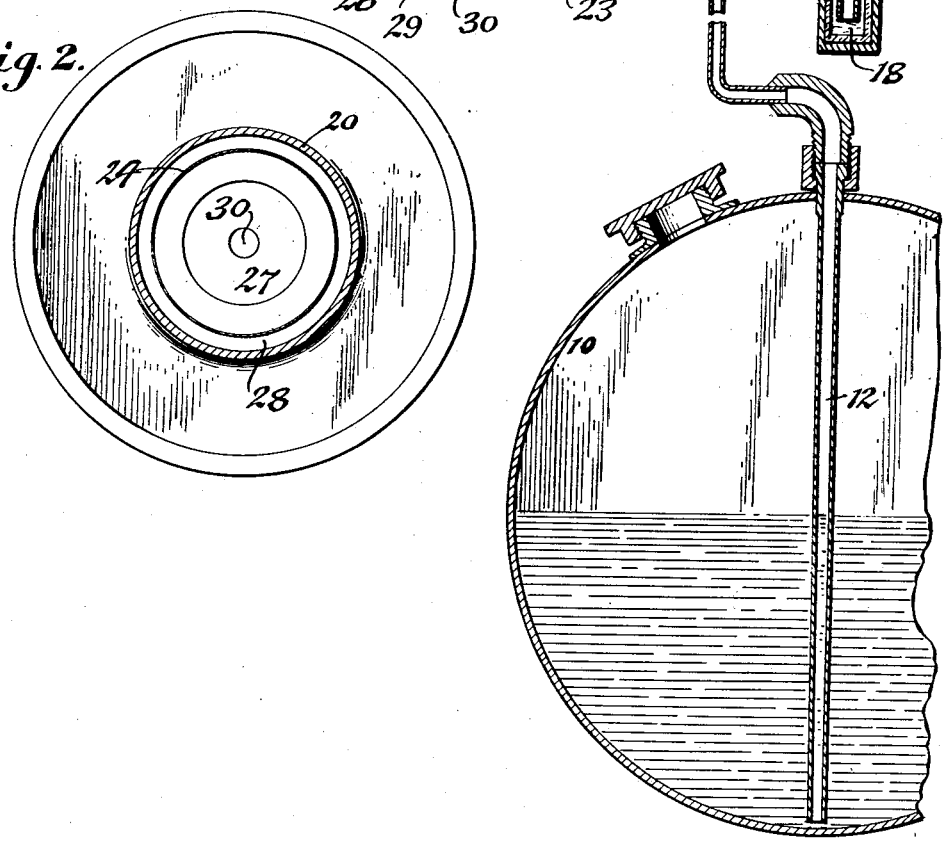

In the accompanying drawings: Figure 1 is a sectional elevation showing one form of my invention embodied in a gauge which has its pressure tube arranged in a gosoline supply tank and the indicating device arranged on an elevated instrument board. Figure 2 is a horizontal section taken on line 2—2, Fig. 1. Figure 3 is a vertical section of the indicating device.

Similar characters of reference indicate corresponding parts throughout the several views.

Although the liquid level gauge may be used for various purposes, the same is shown in the drawings in connection with a gasoline supply or storage tank 10, so that the level of the liquid in the same may be read on an indicating device which is mounted on the elevated instrument board 11 of an automobile or the like.

This gauge in its general organization comprises a pressure member which is arranged in the gasoline tank and which is adapted to receive a variable column of the liquid in the tank, and an indicating member which is operatively associated with the pressure member and responds to variations in the height of the column of liquid in the pressure member.

The pressure member preferably consists of a tube 12 extending downwardly through the top of the gasoline tank and communicating at its lower end with the liquid therein at the full depth to be measured.

The indicating device consists generally of a depending tube 13 which is open at its lower end and provided at its upper end with a supporting head or bracket 14 which is secured to the instrument board, an upright tube 15 of glass or similar material surrounding the depending tube and communicating at its lower end with the lower end of the depending tube while its upper end communicates with the outer atmosphere by a vent 50, and a guard connected with said head and partly enclosing said outer upright tube and provided on its front side with a sight opening 16, one or both vertical edges of which are provided with a row of graduated projections 17. Within the lower parts of the depending and upright tubes of the indicating device is arranged a body 18 of indicating liquid such as oil.

Extending from the upper end of the pressure tube 12 to the upper end of the depending tube 13 of the indicating device is a transmission tube or conduit 19 which contains the air whereby the variations in pressure due to fluctuations in the height of the column of liquid in the pressure tube are transmitted to the liquid in the indicating device.

As the level of the liquid in the tank rises, a corresponding rise of the column of liquid occurs in the pressure pipe or tube which causes the air in the transmission conduit to transmit this pressure to the upper surface of the liquid in the depending tube of the indicator, whereby the liquid in the latter is depressed and a corresponding rise of the same is produced in the upright tube. When the liquid in the tank and the pressure tube descends and the air pressure in the transmission tube is reduced, the liquid in the upright tube lowers and that in the depending tube rises, so that the level of the liquid in the upright tube corresponds to the level of the liquid in the tank, and this can be readily determined by reading the level of the liquid in connection with the projections 17 which have been calibrated for this purpose and also to suit barometric changes.

In the absence of any provision to avoid it, a variation will occur in the reading of the indicating device when changes take place in the temperature of the atmosphere, inasmuch as such changes influence the air which is trapped in the transmission pipe or line by increasing or decreasing the volume of the same in accordance with the variations in the temperature. This variation becomes more pronounced as the distance from the gasoline tank or reservoir to the indicating device increases, due to the increased volume of air within the transmission pipe.

In order to insure a correct reading of the indicating device, means are provided which respond to variations in temperature changes and automatically increase and decrease the volume of the trapped air due to external temperature variations. The form of compensating device for this purpose shown in Figs. 1 and 2 is constructed as follows:

20, 21 designate the upper and lower sections of the wall of an outer enclosing casing, the upper section being of cylindrical form and having an upper head 22 and the lower section being corrugated in the form of a bellows and connected at its upper end with the lower end of the upper section 20 while its lower end is provided with a head 23.

Within the outer casing is arranged an inner casing having a wall 24 which is corrugated in the form of a bellows and is provided at its upper and lower ends with heads 25, 26, thereby forming the inner casing which has an expansion chamber 27 completely sealed and cut off from communication with the external atmosphere and also from communication with the compensating chamber 28 which is formed between the inner and outer casings. The lower head of the expansion chamber is connected with the lower head of the compensating chamber and provided with a filling nipple 29 extending through the last mentioned head, which nipple is normally closed by a plug 30. Within the expansion chamber is confined a body of air or a liquid which expands and contracts rapidly in response to variations in temperature, such for instance as carbon tetra-chloride.

Projecting through the upper head 22 of the compensating chamber is a nipple 31 which communicates at its upper or outer end with the transmission line between the ends of the same while its inner end is connected with the upper head of the expansion chamber and communicates with the upper end of the compensating chamber. This latter may be filled with air, or any suitable liquid such as oil.

In the operation of this apparatus, an increase in the atmospheric temperature causes expansion of the air in the transmission pipe and also the fluid in the expansion chamber, whereby the lower head of the compensating chamber will be moved away from the upper head thereof and thus increase the displacement within the compensating chamber which communicates with the trapped air in the transmission pipe. As a result of this enlarged displacement, a compensation is provided for the expansion of the air in the transmission pipe due to a rise in temperature. A corresponding compensation occurs when a lowering temperature causes the fluid in the transmission line and expansion chamber to contract at which time the lower head of the expansion chamber moves toward the upper head thereof and thus raises the lower head of the compensating chamber, so that the displacement of the latter and the conduits connecting therewith is reduced. During this action, the compensating and expansion chambers are free to expand and contract due to the corrugated or bellows-shaped walls of the same. It will now be apparent that by means of this apparatus, an automatic adjustment of the displacement will be effected in accordance with any change in temperature or atmospheric pressure, so that the pressure in the transmission pipe and connecting passages, due to increase and decrease in the volume of air therein during temperature or barometric changes, is practically constant and permits of obtaining a substantially correct reading on the indicating device of the level or amount of liquid in the storage tank or reservoir.

The amount of displacement in the trapped air transmission line according to its length can be readily calculated, so that a compensating device having approximately the right capacity may be used in connection therewith.

I claim as my invention:

In a liquid gauge, the combination with a tank for containing a liquid, of a compensating device responsive to the temperature changes and indicating means, said compensating device comprising a casing provided with inner and outer expansion and compensating chambers which are incommunicable, the lateral wall of the expansion chamber being of accordion type and separating the two chambers, a movable head and an accordion type wall connecting the head to the casing for closing the compensating chamber, said head carrying an additional head for closing one end of the expansion chamber, said casing having a tubular neck at its end opposite the said two heads, said neck having its passage in communication with the compensating chamber and the neck carrying a head for the other end of the expansion chamber, a tube connecting said passage and the indicating means, and an additional tube communicating with said passage and in turn extending into and adjacent the lower part of the tank below the liquid level, whereby as the compensating device responds to the temperature changes, the level of the liquid may show on the indicating means.

ALICK L. CARTER.